United States Patent [19]

Jue

[11] 4,398,441

[45] Aug. 16, 1983

[54] LABEL CUTTER FOR IMPACT PRINTERS

[75] Inventor: Clifford T. Jue, Edmonds, Wash.

[73] Assignee: Interface Mechanisms, Lynnwodd, Wash.

[21] Appl. No.: 312,240

[22] Filed: Oct. 19, 1981

Related U.S. Application Data

[63] Continuation of Ser. No. 90,289, Nov. 1, 1979, abandoned.

[51] Int. Cl.³ .............................................. B23D 17/00

[52] U.S. Cl. ......................................... 83/575; 83/585; 83/589; 83/607

[58] Field of Search .................. 83/575, 582, 584–586, 83/589, 601, 607, 608, 609; 30/165, 228, 253, 268

[56] References Cited

U.S. PATENT DOCUMENTS

| | | | |
|---|---|---|---|
| 391,268 | 10/1888 | Parker | 30/165 |
| 635,457 | 10/1889 | Yandall | 83/582 |
| 1,065,882 | 6/1913 | Lockwood | 83/589 |
| 1,200,567 | 10/1916 | Yeakel | 83/584 |
| 1,808,054 | 6/1931 | Meese | 83/601 |
| 2,766,823 | 10/1956 | Purmal | 83/589 |
| 2,881,833 | 4/1959 | Hoffee | 83/584 |
| 3,264,924 | 8/1966 | Yaron | 83/575 |
| 3,456,537 | 7/1969 | Quinn | 83/162 |
| 3,665,798 | 5/1972 | Tapert et al. | 83/575 |
| 4,056,025 | 11/1977 | Rubel | 83/575 |

*Primary Examiner*—James M. Meister

*Attorney, Agent, or Firm*—Christensen, O'Connor, Johnson & Kindness

[57] ABSTRACT

A label cutter particularly adapted for use with impact printers includes a stationary blade 34 and a movable blade 33, each of which has an elongated cutting edge 34A, 33A formed thereon. A first end of the movable blade is pivotally secured (70, 72, 74, 76) to a corresponding first end of the stationary blade so that the cutting edges face each other. A tension spring 84 and an arm 82 yieldably rotate the movable blade to a rest position away from the stationary blade, and also yieldably deflect a second end of the movable blade so that the cutting edge of the movable blade is pressed into contact with the cutting edge of the stationary blade as the movable blade is rotated from its rest position towards the stationary blade. An electrical solenoid 86 has a plunger 90 pinned to the movable blade, whereby the application of an electrical signal to the solenoid causes the movable blade to be moved at a relatively high speed towards the stationary blade. The cutting edges of the movable and stationary blades are defined by the lines of intersection of first and second substantially planar surfaces 100, 102 and 104, 106 thereon, with the first surfaces extending transversely to a plane 76 of rotation of the cutting edge of the movable blade and with the second surfaces being angularly disposed in respective opposite directions from that plane by substantially equal acute angles $\alpha_1$, $\alpha_2$. In order to maintain contact between the cutting edges of the blades as the movable blade is rotated at relatively high speeds, the mass of the second end of the movable blade is greater than that of the first end thereof.

17 Claims, 5 Drawing Figures

LABEL CUTTER FOR IMPACT PRINTERS

This is a continuation of the prior application Ser. No. 090,289, filed Nov. 1, 1979, now abandoned, the benefit of the filing date of which is hereby claimed under 35 USC 120.

FIELD OF THE INVENTION

This invention generally relates to mechanical impact printers, and, more particularly, to an improved label cutter for use with such printers.

BACKGROUND OF THE INVENTION

Mechanical impact printers are known to the prior art for imprinting a succession of characters, which may comprise machine-readable and human-readable alphanumeric characters, on an elongated strip of print stock. In such printers, the elongated strip is drawn under tension from a rotatable print stock supply reel by a rotating, print stock drive capstan and an associated pinch roller, and moved along a predetermined path through a print station where the characters are successively imprinted. The print station may include a continuously rotating cylindrical print wheel having located on a circumferential surface thereof a plurality of raised elements representing the characters to be imprinted, and a hammer mechanism including at least one hammer which has a selectively controllable, pivotal movement in a predetermined plane, whereby a face of the hammer during hammer travel impacts the elongated strip and an interposed ink ribbon against one of the elements on the print wheel, resulting in imprinting of a character.

In one application, the print stock has a thermally-sensitive adhesive layer formed on the print stock surface that faces the hammer mechanism, whereby the hammer face impacts the adhesive layer to drive the print stock and the interposed ink ribbon into contact with an element on the print wheel. After imprinting of a plurality of successive characters on the print stock and concurrent advancement of a predetermined length of the print stock through the print station, a cutter severs the predetermined length to accordingly form a label which may be removed from the printer. The printer is then caused to advance successive lengths of the print stock through the print station in order to form successive labels. In order to apply each label to a desired surface, the label is heated to activate the adhesive layer thereon.

The cutter includes a movable blade and a stationary blade, each having an elongated cutting edge formed thereon. Upon the application of an electrical signal to a solenoid mechanically coupled to the movable blade, the movable blade is moved from a rest position towards the stationary blade, whereby the cutting edges thereof contact each to sever the print stock to form a label. Upon removal of the electrical signal from the solenoid, a spring returns the movable blade to its rest position.

As the rate of production of labels by the printer is increased, the time required for the cutter to completely sever a label, and thus the speed of movement of the movable blade, must be increased. At relatively low label production rates, cutters of the type described provide acceptable operation and cleanly sever the print stock. However, at relatively high label production rates, the cutters of the prior art tend to provide ragged cuts, and in some instances may not completely sever the print stock. Accordingly, the label production rate of the printer is limited by the maximum speed at which the cutter can satisfactorily operate.

In the application discussed above in which the print stock is provided with an adhesive layer, it has also been found that the material of the adhesive layer tends to build up on the cutting edges of the movable and stationary blades, thereby resulting in increasingly ragged cuts which necessitate frequent cleaning of the cutting edges and a consequent lowering of the label production rate.

It is therefore an object of this invention to provide an improved label cutter for mechanical impact printers.

It is another object of this invention to provide such a label cutter which cleanly severs an elongated strip of print stock at very high operating speeds, thereby allowing a high rate of label production by the printer.

It is another object of this invention to provide such a label cutter which does not require frequent cleaning when used with print stock having an adhesive layer formed thereon.

SUMMARY OF THE INVENTION

Briefly, the foregoing objects, and other objects and advantages that will be apparent to those of ordinary skill in the art, are obtained in an improved label cutter for printing apparatus. The cutter comprises first and second blades, each having an elongated, linear cutting edge formed thereon. The mass of the first blade is greater at a second end thereof than at a first end thereof. A first means is provided for pivotally securing the first end of the first blade to a corresponding first end of the second blade, so that the cutting edges of the blades face each other and so that the cutting edge of the first blade is free to rotate in a predetermined plane in which is located the cutting edge of the second blade. A second means is coupled to the first blade at a point between the first and second edges thereof, and yieldably rotates the first blade to a rest position angularly disposed, in the aforementioned predetermined plane, from the second blade. The second means also yieldably deflects the second end of the first blade away from the predetermined plane so that the cutting edge of the first blade is pressed into point contact with the cutting edge of the second blade as the first blade is rotated from its rest position towards the second blade. A third means is provided which can be selectively actuated to rotate the first blade from its rest position toward the second blade.

In a preferred embodiment, the first and second blades each include a first substantially planar surface transverse to the predetermined plane, and a second substantially planar surface that intersects the first substantially planar surface to define the cutting edge. The second surfaces of the first and second blades are angularly disposed in respective opposite directions from the predetermined plane by substantially equal acute angles.

In the preferred embodiment, the first blade includes a first plate-like member of relatively constant cross section between its first and second ends. The mass of the second end of the first blade is increased by the securing of a second member thereto. As an example, the second member may be cylindrical and may be secured to a substantially planar surface of the plate-like member which opposes a corresponding substantially planar surface of the plate-like member which defines, in part, the cutting edge.

BRIEF DESCRIPTION OF THE DRAWINGS

The invention can best be understood by reference to the following portion of the specification, taken in conjunction with the accompanying drawings in which.

DESCRIPTION OF THE PREFERRED EMBODIMENT

Figure 1:
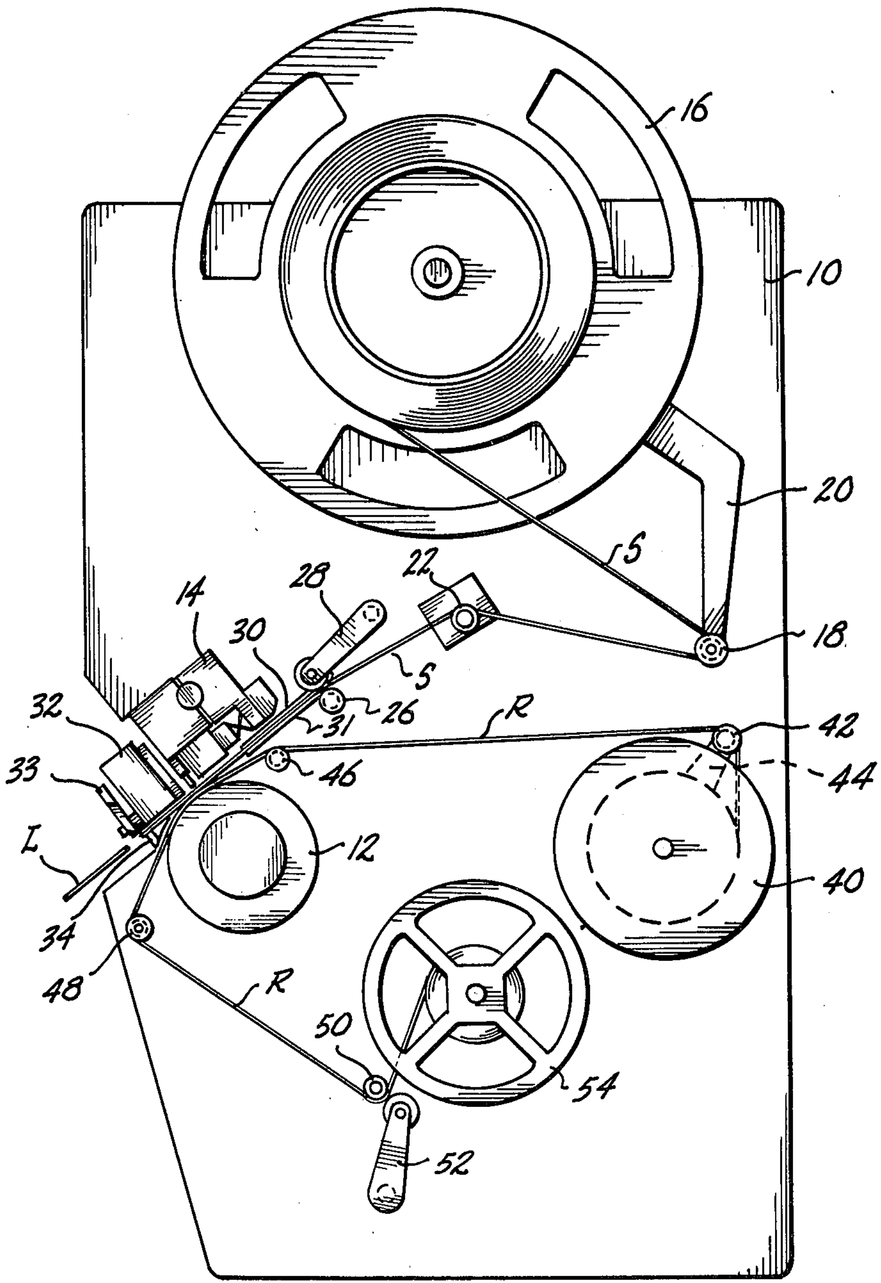
FIG. 1 is an elevational view of an impact printer including the improved label cutter of the present invention.
Figure 2:
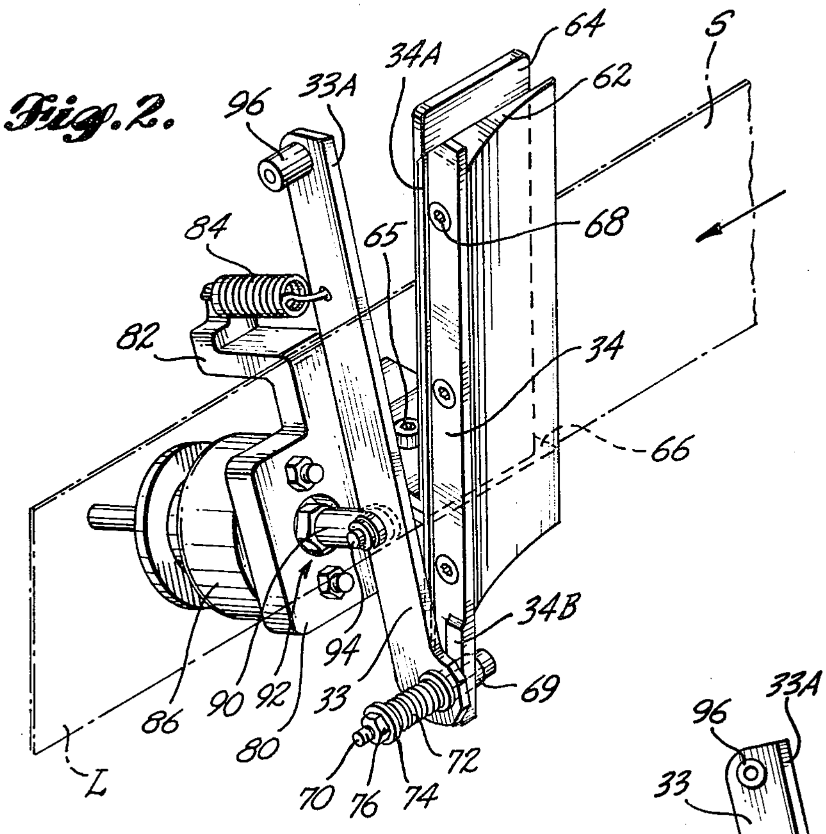
FIG. 2 is a pictorial view of the cutter.

Referring now to FIG. 1, an impact printer includes a base plate 10 above which a print wheel 12 is supported for rotation. A plurality of raised character elements representing the characters to be imprinted are located around the circumferential surface of print wheel 12, with the raised character elements being grouped in a plurality of spaced-apart rows each transverse to the axis of rotation of print wheel 12. A drive means, not illustrated, continuously rotates print wheel 12 about its axis. A hammer bank assembly 14 is located in proximity to print wheel 12 and together with print wheel 12 forms a print station. As explained in more detail hereinafter, the hammer bank assembly 14 includes a plurality of spaced-apart hammers, one for each character row to be imprinted. Each hammer is capable of a controllable, pivotal movement whereby a hammer face thereof impacts an adhesive layer located on a back surface of an elongated strip of print stock S to press the front surface of the print stock S and an interposed elongated strip of ribbon stock R against one of the raised elements on the print wheel 12 to thereby imprint a character on print stock S.

The print stock S is obtained from a print stock supply reel 16 which is supported for rotation above base plate 10. From the print stock supply reel 16, the print stock is first drawn around a supply tension roller 18 supported on a spring-biased, rotatable arm 20 and from there moves in a predetermined path around a guide pin 22, between a drive capstan 26 and an associated pinch roller 28, through a pair of spaced-apart guide plates 30, 31, through the print station, and to a label cutter 32. The drive capstan 26 is rotated by a drive capstan motor, not illustrated. During its passage from print stock supply reel 16 to drive capstan 26, the print stock is maintained under tension by the forces exerted on tension roller 18 by spring-biased arm 20, acting against the forces exerted on the print stock by drive capstan 30 and its associated pinch roller 28. From drive capstan 26 to the label cutter 32, the print stock is advanced through guide plates 30, 31 and the print station to label cutter 32 by the forces exerted on the print stock by drive capstan 30 and its associated pinch roller 28.

The elongated strip of ribbon stock R is obtained from a ribbon stock supply reel 40 which is supported for rotation above base plate 10. From the ribbon stock supply reel 40, the ribbon stock passes around a tension roller 42 mounted on a spring-biased, rotatable arm 44 and around a guide pin 46 to the print station. Immediately after leaving the print station, the ribbon stock passes around a guide pin 48 and thereafter is pressed against a drive capstan 50 by an associated pinch roller 52, and then is taken up on a ribbon take-up reel 54 which is rotated by a ribbon drive motor, not illustrated. During its passage through the impact printer from the ribbon stock supply reel 40 to the drive capstan 50, the ribbon stock R is maintained under tension by the forces exerted on tension roller 42 by spring-biased arm 44, acting against the forces exerted on the ribbon stock by drive capstan 50 and its associated pinch roller 52.

As is conventional in the prior art, electronic control means is provided for controlling and coordinating the rotation of drive capstans 26, 50 to provide movement of the print stock and the ribbon stock through the print station. Electronic control means is likewise provided for coordinating the movement of the hammers within the hammer bank assembly 14 with the rotation of print wheel 12 under control of timing signals obtained from print wheel 12 to provide imprinting of selected characters in succession in a plurality of rows on the front surface of the print stock.

After a desired number of characters have been imprinted in each row on the print stock, the print stock is advanced through the print station until the free end thereof passes through the label cutter 32. The print stock is then maintained stationary (by momentarily terminating rotation of drive capstan 26) and label cutter 32 is energized so that a movable blade 33 thereof engages a stationary blade 34 thereof to sever a predetermined length of the print stock to accordingly form a label L which is manually or automatically removed from the printer. The label is then heated, by means not illustrated, to activate the adhesive layer thereon so that the label may be applied to a desired surface. By moving a plurality of successive predetermined lengths of the print stock through the print station and through the label cutter 32, and by energizing the label cutter 32 in synchronism with such movement, a plurality of successive labels may be produced.

Referring now to FIGS. 2–5, the label cutter 32 includes a base 60 which is affixed to the top of base plate 10 of the printer by a plurality of fasteners, not illustrated. A guide plate 62 is integral with base 60 and extends above a substantially planar surface 66 thereof. A guide plate 64 also extends above surface 66 in proximity to guide plate 62, and is secured to base 60 by a plurality of fasteners 65 passing through a flange portion 64A of guide plate 64. The opposing surfaces of guide plate 62, 64 are parallel to but spaced apart from each other, and extend at right angles from surface 66 to accordingly define a slot for passage of the print stock S. As the print stock passes through this slot, its opposing major surfaces (its front and back surfaces) are substantially parallel to the opposing surfaces of guide plates 62, 64, and its lower edge surface is in contact with and rides on the portion of surface 66 between guide plates 62, 64.

The stationary blade 34 comprises a substantially plate-like member which is secured to a portion of guide plate 62 by a plurality of fasteners 68, so that the longitudinal dimension of a cutting edge 34A thereof is perpendicular to surface 66. Movable blade 33 also comprises a substantially plate-like member and is pivoted on stationary blade 34 by a bushing 69 passing through corresponding apertures in the lower ends of blades 34, 33. Stationary blade 34 is provided with a substantially planar, bearing surface 34B adjacent its lower end, with surface 34B being coplanar with cutting edge 34A. A machine screw 70 is fitted through bushing 69, and a compression spring 72 and a washer 74 are fitted over the portion of machine screw 70 protruding from movable blade 33. A nut 76 is then threaded on to the end of machine screw 70 to exert force on compression spring 72, whereby the lower end of movable blade 33 is pressed into contact with bearing surface 34B on stationary blade 34. As a result, cutting edge 33A of movable blade 33 is free to rotate in a predetermined plane 78 (see FIG. 5) in which is located cutting edge 34A of stationary blade 34.

Figure 3:
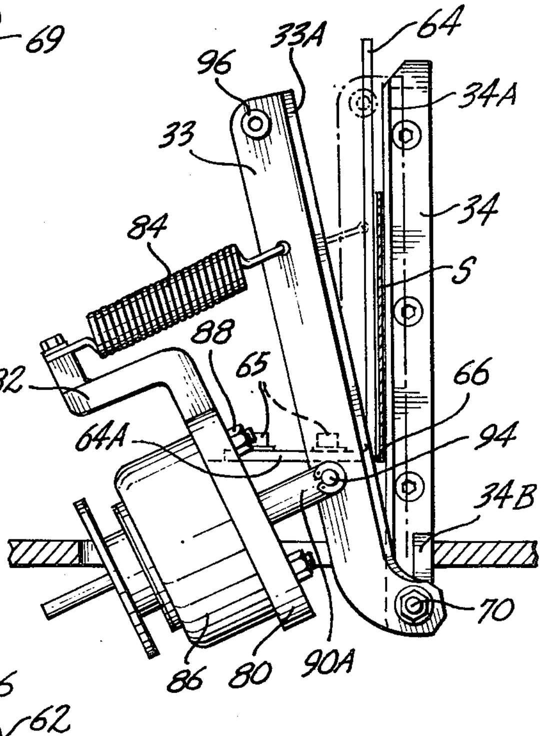
FIG. 3 is a side elevational view of the cutter.
Figure 4:
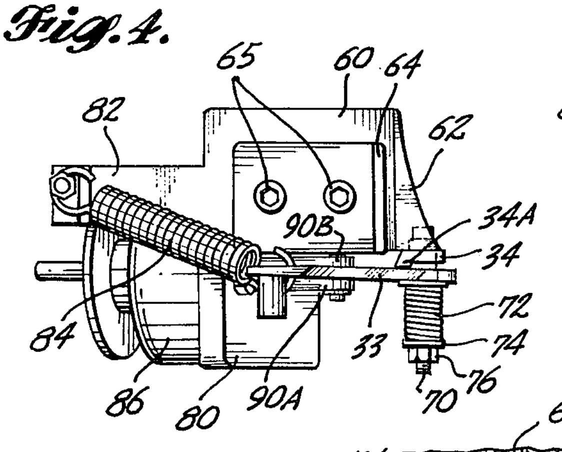
FIG. 4 is a top plan view of the cutter.

A plate 80 extends from and is integral with base 60, and is angularly disposed with respect to the longitudinal extension of cutting edge 34A (see FIG. 3). Integral with and extending from plate 80 is an arm 82 whose end is offset from plane 78 in a direction toward guide plates 62, 64 (see FIGS. 4 and 5). A tension spring 84 has one end secured to the end of arm 82, and another end secured to movable blade 33 at a point near the end of movable blade 33 away from its pivoted end. As a result, movable blade 33 is yieldably biased to a rest position away from stationary blade 34, and is also yieldably deflected away from plane 78 and towards guide plates 62, 64.

Accordingly, as movable blade 33 is moved toward the stationary blade 34, the cutting edge 33A engages the cutting edge 34A at corresponding points thereon that progressively ascend from surface 66. Accordingly, the print stock S is cleanly severed by a scissors-like action.

Movement of movable blade 33 toward stationary blade 34 is provided by an electrical solenoid 86 which is secured to plate 80 by a plurality of fasteners 88. Solenoid 86 has a reciprocable plunger 90 which extends through a corresponding aperture in plate 80 and whose end is bifurcated to form first and second tines 90A, 90B. Movable blade 33 is received between tines 90A, 90B, at a location between its ends, and is secured to plunger 90 by a pin 94 passing through tines 90A, 90B and movable blade 33.

Upon energization of solenoid 86, plunger 90 thereof is extended to rotate movable blade 33 from its rest position to the dotted-line position illustrated in FIG. 3, thereby severing the print stock S. Upon deenergization of solenoid 86, tension spring 84 returns movable blade 33 to its rest position.

As previously described, the operation of the cutter 32 is synchronized with the remainder of the impact printer. In order to achieve high label production rates, the cutter 32 must be capable of very quickly moving the movable blade from its rest position to its dotted-line position illustrated in FIG. 3, and back to the rest position. As an example, the movable blade may be moved from its rest position to its dotted-line position in about eight milliseconds. At such a high operating speed, it has been found that ragged cuts of the print stock may occur. It will be noted that the upper end of movable blade 33 is biased toward guide plates 62, 64 by tension spring 84 when movable blade 33 is in its rest position. As movable blade 33 is moved toward stationary blade 34, the upper end of movable blade 33 is progressively moved away from guide plates 62, 64, in a direction parallel to the axis of rotation defined by machine screw 70, due to the progressively ascending point contact between cutting edge 33A and cutting edge 34A. At high operating speeds, this axial movement of movable blade 33 is sufficient to bring cutting edge 33A out of contact with cutting edge 34A, thereby resulting in a ragged cut. In order to resist this axial movement and to maintain a progressively ascending point contact between cutting edge 33A and cutting edge 34A, the mass of the upper end of movable blade 33 is increased with respect to that of the lower end of movable blade 33. As illustrated, this increased mass may be provided by securing a small cylindrical weight 96 to the upper end of movable blade 33. The amount of increased mass is empirically chosen for the desired operating speed of the cutter.

Figure 5:
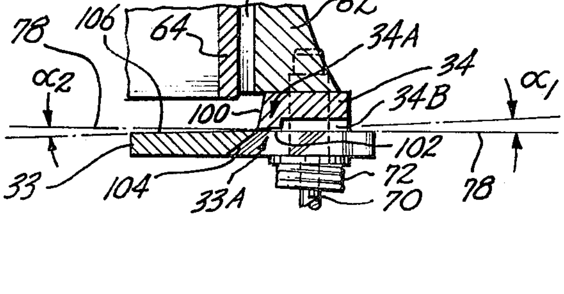
FIG. 5 is an enlarged cross-sectional view of the movable and stationary blades of the cutter.

The ascending point contact between the cutting edge 33A and the cutting edge 34A, in addition to providing precise cuts of the print stock, also is advantageous when the print stock has located thereon a layer of adhesive material. If the movable and stationary blades were to contact each other with a wiping motion, in which a substantially planar face on the movable blade slid over a corresponding substantially planar face on the stationary blade, adhesive material would accumulate on the substantially planar faces thereby leading to ragged cuts. With particular reference now to FIG. 5, the cutting edge 34A is defined by the intersection of surfaces 100, 102 of stationary blade 34, each of which is substantially planar. Surface 100 extends transverse to plane 78, and surface 102 is angularly disposed from plane 78 by an acute angle $\alpha_1$. Similarly, the cutting edge 33A is defined by the intersection of surfaces 104, 106 of movable blade 33, each of which is substantially planar. Surface 104 extends transverse to plane 78, and surface 106 is angularly disposed from plane 78 by an acute angle $\alpha_2$. The surfaces 102, 106 are angularly disposed in opposite directions from plane 78, with angles $\alpha_1$, $\alpha_2$ being substantially equal-valued (e.g., 2°, so that only cutting edge 34A is in point contact with cutting edge 33A to minimize the accumulation of adhesive material on surface 102, 106.

While the invention has been described with reference to a preferred embodiment, it is to be clearly understood with those skilled in the art that the invention is not limited thereto, and that the scope of the invention is to be interpreted only in conjunction with the appended claims.

The embodiments of the invention in which an exclusive property or privilege is claimed are defined as follows:

1. An improved high speed label cutter for printing apparatus, said cutter comprising:

a first blade having an elongated, linear cutting edge formed thereon;

a second blade having an elongated, linear cutting edge formed thereon;

first means pivotally securing a first end of said first blade to a corresponding first end of said second blade so that said cutting edges thereof face each other and so that said cutting edge of said first blade is free to rotate in a predetermined plane in which is located said cutting edge of said second blade;

second means coupled to said first blade at a point between said first end and a second end thereof, for yieldably rotating said first blade to a rest position angularly disposed from said second blade in said predetermined plane, and for yieldably deflecting said second end of said first blade away from said predetermined plane so that said cutting edge of said first blade is pressed into a progressively ascending point contact with said cutting edge of said second blade as said first blade is rotated from said rest position toward said second blade, the mass of said first blade being greater at said second end thereof than at said first end thereof, said mass of said second end being sufficient to retard movement of said second end of said first blade in a direction transverse to said predetermined plane so as to maintain said cutting edge of said first blade in contact with said cutting edge of said second blade throughout a cutting stroke as said first blade is rotated from said rest position at a predetermined speed; and, third means that can be selectively actuated to rotate said first blade from said rest position toward said second blade.

2. A cutter as recited in claim 1, wherein said third means comprises an electrical solenoid.

3. A cutter as recited in claim 2, where said electrical solenoid has a reciprocally-movable plunger which is pinned to said first blade at a point between said first and second ends thereof.

4. A cutter as recited in claim 1, wherein said first blade includes a first, plate-like member of relatively constant cross-section between said first and said second ends of said first blade; and, a second member secured to said first member at said second end of said first blade.

5. A cutter as recited in claim 4, wherein said first member has opposing, spaced-apart, substantially planar surfaces, one of which defines in part said cutting edge of said first blade; and, wherein said second member comprises a cylindrical member secured to one of said surfaces.

6. A cutter as recited in claim 5, wherein said cylindrical member is secured to the surface of said first member opposing the surface which forms in part said cutting edge.

7. An improved label cutter for printing apparatus, said cutter comprising:

a first blade having an elongated, linear cutting edge formed thereon;

a second blade having an elongated, linear cutting edge formed thereon;

first means pivotally securing a first end of said first blade to a corresponding first end of said second blade so that said cutting edges thereof face each other and so that said cutting edge of said first blade is free to rotate in a predetermined plane in which is located said cutting edge of said second blade;

an electrical solenoid that can be selectively actuated to rotate said first blade from a rest position angularly disposed from said second blade in said predetermined plane toward said second blade, said solenoid having a reciprocally movable plunger, said plunger being pivotally affixed to said first blade at a point between said first end and a second end thereof;

a base and means securing said second blade to said base, said base including a plate extending therefrom that is angularly disposed from said second blade in said predetermined plane, means securing said electrical solenoid to said plate; and, second means coupled to said first blade at a point between said first and second ends thereof for yieldably rotating said first blade to said rest position and for yieldably deflecting said second end of said first blade away from said predetermined plane so that said cutting edge of said first blade is pressed into a progressively ascending point contact with said cutting edge of said second blade as said first blade is rotated from said rest position toward said second blade, said second means including an arm extending from said plate, at least a portion of said arm being offset from said predetermined plane and a tension spring whose first end is secured to said portion of said arm and whose second end is secured to said first blade.

8. An improved label cutter for printing apparatus, said cutter comprising:

a first blade having an elongated, linear cutting edge formed thereon;

a second blade having an elongated, linear cutting edge formed thereon;

first means pivotally securing a first end of said first blade to a corresponding first end of said second blade so that said cutting edges thereof face each other and so that said cutting edge of said first blade is free to rotate in a predetermined plane in which is located said cutting edge of said second blade, said first and said second blade each including a first substantially planar surface transverse to said predetermined plane, and a second substantially planar surface that intersects said first substantially planar surface to define said cutting edge, said second surfaces of said first and second blades being angularly disposed in respective, opposite directions from said predetermined plane by substantially equal, acute angles;

second means coupled to said first blade at a point between said first end and a second end thereof, for yieldably rotating said first blade to a rest position angularly disposed from said second blade in said predetermined plane, and for yieldably deflecting said second end of said first blade away from said predetermined plane so that said cutting edge of said first blade is pressed into a progressively ascending point contact with said cutting edge of said second blade as said first blade is rotated from said rest position toward said second blade; and, third means that can be selectively actuated to rotate said first blade from said rest position toward said second blade.

9. A cutter as recited in claim 8 wherein said angles are substantially two degrees.

10. A cutter as recited in claim 8 wherein said third means comprises an electrical solenoid.

11. A cutter as recited in claim 10 wherein said electrical solenoid has a reciprocally movable plunger that is pivotally attached to said first blade at a point between said first and second ends thereof.

12. A cutter as recited in claim 8 wherein said first blade includes a first plate-like member of relatively constant cross section between said first and second ends thereof and a second member secured to said first member at said second end of said first blade, said second member being of a mass sufficient to increase the mass of said second end of said first blade so as to maintain said first blade in contact with said second blade as said first blade is rotated from said rest position at a predetermined speed.

13. A cutter as recited in claim 12 wherein said first member has opposing spaced apart substantially planar surfaces, one of which defines in part said cutting edge of said first blade and wherein said second member comprises a cylindrical member secured to one of said surfaces.

14. A cutter as recited in claim 13 wherein said cylindrical member is secured to the surface of said first member opposing the surface that forms in part said cutting edge.

15. An improved label cutter for printing apparatus, said cutter comprising:

a first blade having an elongated, linear cutting edge formed thereon;

a second blade having an elongated, linear cutting edge formed thereon;

first means pivotally securing a first end of said first blade to a corresponding first end of said second blade so that said cutting edges thereof face each other and so that said cutting edge of said first blade is free to rotate in a predetermined plane in which is located the cutting of said second blade;

an electrical solenoid that can be selectively actuated to rotate said first blade from a rest position angularly disposed from said second blade in said predetermined plane toward said second blade, said solenoid having a reciprocally movable plunger, said plunger being pivotally affixed to said first blade at a point between said first end and a second end thereof;

a base and means securing said second blade to said base, said base including a plate extending therefrom that is angularly disposed from said second blade in said predetermined plane, means securing said electrical solenoid to said plate; and, second means coupled to said first blade at a point between said first and second ends thereof for yieldably rotating said first blade to said rest position and for yieldably deflecting said second end of said first blade away from said predetermined plane so that said cutting edge of said first blade is pressed into a progressively ascending point contact with said cutting edge of said second blade as said first blade is rotated from said rest position toward said second blade, the mass of said first blade being greater at said second end thereof than at said first end thereof, said mass of said second end being sufficient to maintain said cutting edge of said first blade in contact with said cutting edge of said second blade as said first blade is rotated from said rest position at a predetermined speed, said second means including an arm extending from said plate, at least a portion of said arm being offset from said predetermined plane, and a tension spring whose first end is secured to said portion of said arm and whose second end is secured to said first blade.

16. An improved label cutter for printing apparatus, said cutter comprising:

a first blade having an elongated, linear cutting edge formed thereon;

a second blade having an elongated, linear cutting edge formed thereon;

first means pivotally securing a first end of said first blade to a corresponding first end of said second blade so that said cutting edges thereof face each other and so that said cutting edge of said first blade is free to rotate in a predetermined plane in which is located said cutting edge of said second blade, said first and second blades each including a first substantially planar surface transverse to said predetermined plane and a second substantially planar surface that intersects said first substantially planar surface to define said cutting edge, said second surfaces of said first and second blades being angularly disposed in respective, opposite directions from said predetermined plane by substantially equal, acute angles;

second means coupled to said first blade at a point between said first end and a second end thereof for yieldably rotating said first blade to a rest position angularly disposed from said second blade in said predetermined plane and for yieldably deflecting said second end of said first blade away from said predetermined plane so that said cutting edge of said first blade is pressed into a progressively ascending point contact with said cutting edge of said second blade as said first blade is rotated from said rest position toward said second blade, the mass of said first blade being greater at said second end thereof than at said first end thereof, said mass of said second end being sufficient to maintain said cutting edge of said first blade in contact with said cutting edge of said second blade as said first blade is rotated from said rest position at a predetermined speed; and, third means that can be selectively actuated to rotate said first blade from said rest position toward said second blade.

17. A cutter as recited in claim 16, wherein said angles are substantially 2°.

* * * * *

UNITED STATES PATENT AND TRADEMARK OFFICE

CERTIFICATE OF CORRECTION

PATENT NO. : 4,398,441

DATED : August 16, 1983

INVENTOR(S) : Clifford T. Jue

It is certified that error appears in the above-identified patent and that said Letters Patent is hereby corrected as shown below:

On the title page, Item /73/ should read

-- Intermec Corporation --.

Column 7, line 17, "where" should read -- wherein --.

Column 9, line 16, after "cutting" insert -- edge --.

Signed and Sealed this

*Sixth* Day of *November 1984*

[SEAL]

*Attest:*

GERALD J. MOSSINGHOFF

*Attesting Officer* *Commissioner of Patents and Trademarks*